March 11, 1941.  A. R. HEDGES  2,234,344
SWIVEL SEAT CONSTRUCTION
Filed Oct. 4, 1939
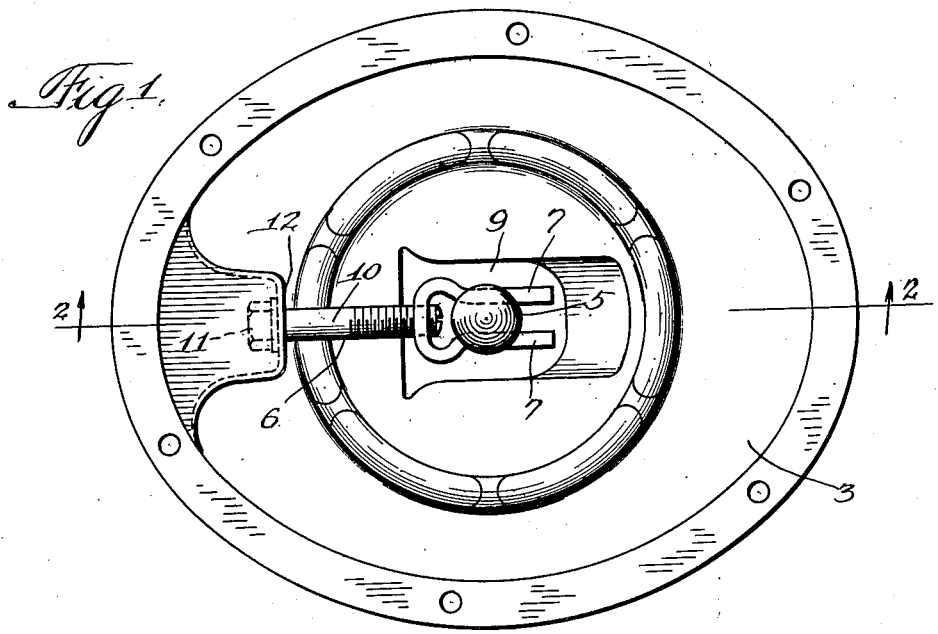
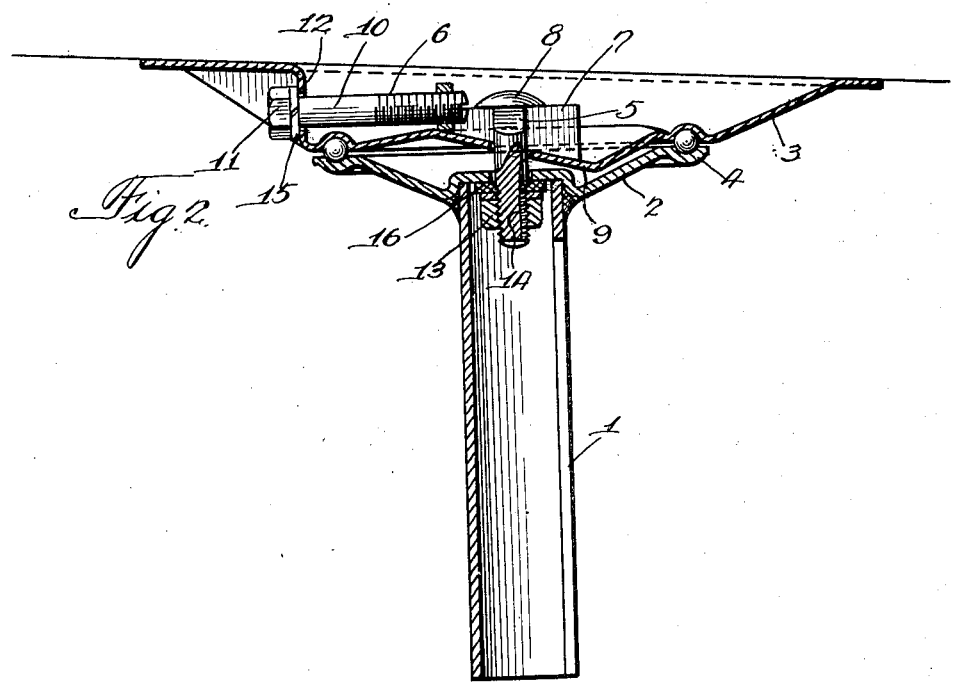
Inventor:
Albert R. Hedges
By Amro, Thiess, Olsen & Mecklenburger
Attys.

Patented Mar. 11, 1941

2,234,344

UNITED STATES PATENT OFFICE 2,234,344

SWIVEL SEAT CONSTRUCTION

Albert R. Hedges, Chicago, Ill., assignor to Benjamin Electric Mfg. Company, Des Plaines, Ill., a corporation of Illinois Application October 4, 1939, Serial No. 297,792

4 Claims. (Cl. 155—95)

My invention relates to a swivel seat construction.

One of the objects of my invention is to provide a ball bearing swivel seat construction in which improved means are provided for adjusting and holding the ball race members in proper position.

Further objects and advantages of the invention will be apparent from the description and claims.

In the drawing, in which an embodiment of my invention is shown,

Figure 1 is a plan view of the swivel seat member; and

Fig. 2 is an axial section on the line 2—2 of Fig. 1, showing also the lower ball race member and the supporting post.

Referring to the drawing in detail, the construction shown comprises a tubular supporting post 1 which may be of metal, a lower ball race member 2 secured to this post in any suitable manner, as by welding, an upper ball race and seat-supporting member 3 supported on the lower ball race member, a series of balls 4 seated in the raceways, a headed tension member 5 for holding the ball race members 2 and 3 in proper position with respect to each other, and manually operable adjusting means 6 for forcing the upper ball race member toward the lower ball race member to insure the proper swiveling action. Both the lower ball race member and the upper ball race and seat-supporting member may, if desired, be of stamped sheet metal.

The adjusting means 6 comprises a U-shaped wedge member having a pair of wedge-shaped arms 7, the upper edges of which engage the head 8 of the bolt 5 and the lower edges of which engage the sloping upper surface of a depressed portion 9 of the upper ball race and seat-supporting member 3, and an adjusting screw 10 having a threaded engagement with the connecting portion of the U-shaped wedge member and having its head 11 held against longitudinal movement by engagement with the wall 12 of a pocket formed in the upper member 3. The nut 13, which is threaded on the end of the bolt 5, may, in assembly, be tightened up to the desired position and locked in this position by mutilating the threads of the nut, causing portions to enter the groove 14 in the bolt. A lock washer 15 may be provided underneath the head of the adjusting screw 10 to hold this screw in the desired adjusted position. Suitable washers 16 may be placed underneath the nut of the securing bolt 5.

In use, the desired pressure of the ball race members on the balls is secured by adjusting the screw to cause the wedge member to shift until the desired pressure is exerted on the connecting bolt 5 to insure proper action of the raceway members with respect to the anti-friction balls 4. It will be noted that the adjusting screw is readily accessible from the outside of the assembly so that it is unnecessary to remove any parts in making an adjustment.

Further modifications will be apparent to those skilled in the art and it is desired, therefore, that the invention be limited only by the prior art and the scope of the appended claims.

Having thus described my invention, what I claim and desire to secure by Letters Patent is:

1. A ball bearing swivel seat construction comprising a supporting post, a ball race member secured thereto, a seat-supporting ball race member cooperating with said first ball race member, balls in the raceways, a headed tension member coaxial with said ball race members for securing said ball race members together, and means acting between the head of said headed member and said seat-supporting ball race member for exerting tension on said tension member and movable with respect to the head of said member for drawing the ball race members toward each other, said seat supporting member having a peripheral seat-supporting portion and a depressed portion forming a recess in which said tension-exerting means are located, and means extending through the wall of said recess for moving said tension-exerting means.

2. A ball bearing swivel seat construction comprising a supporting post, a ball race member secured thereto, a seat-supporting ball race member cooperating with said first ball race member, balls in the raceways, a headed tension member coaxial with said ball race members for securing said ball race members together, and wedge means acting between the head of said headed member and said seat-supporting ball race member for exerting tension on said tension member and movable laterally of the axis of said tension member for drawing the ball race members toward each other.

3. A ball bearing swivel seat construction comprising a supporting post, a ball race member secured thereto, a seat-supporting ball race member cooperating with said first ball race member, balls in the raceways, a headed tension member coaxial with said ball race members for securing said ball race members together, wedge means acting between the head of said headed member and said seat-supporting ball race member for exerting tension on said tension member and movable laterally of the axis of said tension member for drawing the ball race members toward each other, and screw means for actuating said wedge means.

4. A ball bearing swivel seat construction comprising a supporting post, a ball race member secured thereto, a seat-supporting ball race member cooperating with said first ball race member, balls in the raceways, a headed tension member coaxial with said ball race members for securing said ball race members together, wedge means acting between the head of said headed member and said seat-supporting ball race member and movable laterally of the axis of said tension member for exerting tension on said tension member for drawing the ball race members toward each other, and screw means for actuating said wedge means, said seat-supporting member having a peripheral seat-supporting portion and a downwardly depressed portion forming a recess in which said wedge means are located, said screw means extending through the wall of said recess so as to be operable from the outside.

ALBERT R. HEDGES.